US012790252B2

(12) United States Patent
Bourcier et al.

(10) Patent No.: US 12,790,252 B2
(45) Date of Patent: Nov. 10, 2026

(54) MOLD RELEASE COATINGS FOR GLASS FORMING OR PROCESSING EQUIPMENT AND RELATED METHODS

(71) Applicant: CORNING INCORPORATED, Corning, NY (US)

(72) Inventors: Roy Joseph Bourcier, Corning, NY (US); Benedict Yorke Johnson, Horseheads, NY (US); Aniello Mario Palumbo, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 140 days.

(21) Appl. No.: 18/711,990

(22) PCT Filed: Nov. 8, 2022

(86) PCT No.: PCT/US2022/049253

§ 371 (c)(1),
(2) Date: May 21, 2024

(87) PCT Pub. No.: WO2023/096736

PCT Pub. Date: Jun. 1, 2023

(65) Prior Publication Data

US 2025/0019288 A1 Jan. 16, 2025

Related U.S. Application Data

(60) Provisional application No. 63/282,446, filed on Nov. 23, 2021.

(51) Int. Cl.
*C03B 11/06* (2006.01)
*C03B 40/02* (2006.01)

(52) U.S. Cl.
CPC .............. *C03B 11/06* (2013.01); *C03B 40/02* (2013.01); *C03B 2215/11* (2013.01); *C03B 2215/20* (2013.01)

(58) Field of Classification Search
CPC ............................ C03B 40/02; C03B 2215/34
See application file for complete search history.

(56) References Cited

U.S. PATENT DOCUMENTS

| | | | | |
|---|---|---|---|---|
| 3,796,557 A * | 3/1974 | Sponseller | C03B 11/06 65/250 | |
| 3,874,862 A * | 4/1975 | Bickling, Jr. | C10M 7/00 65/169 | |

(Continued)

FOREIGN PATENT DOCUMENTS

| | | | | |
|---|---|---|---|---|
| JP | 2003119047 A * | 4/2003 | C03B 40/02 | |
| WO | WO-2015087429 A1 * | 6/2015 | C03B 11/086 | |

OTHER PUBLICATIONS

Moreau et al., "Influence of swabbing compounds on loading, heat transfer and release performance in hot glass forming"; Glass Technology 55(5), 2014, 9 pages.

(Continued)

*Primary Examiner* — Jodi C Franklin
*Assistant Examiner* — Steven S Lee
(74) *Attorney, Agent, or Firm* — Irene L. Brookins; Daniel J. Greenhalgh; Ye Eun Park

(57) ABSTRACT

In one aspect, a pressing unit is provided, comprising: a mold and a plunger, and a coating configured on at least one of: the surface of the mold and/or the surface of the plunger, where the coating is configured adjacent to the areas where molten or hot glass or glass ceramic touches; wherein the coating comprises: a mold release coating, configured as the gob-contacting surface, wherein the mold release coating comprises: at least two solid lubricants selected from tungsten disulfide, boron nitride, glassy carbon and graphite; and a thermal barrier coating comprising barrier material components and an organo-silica binder.

15 Claims, 5 Drawing Sheets

(56) References Cited

U.S. PATENT DOCUMENTS

| | | | | | |
|---|---|---|---|---|---|
| 3,915,870 | A * | 10/1975 | Brown | B22C 3/00 | 508/141 |
| 3,968,302 | A | 7/1976 | Brown | | |
| 4,039,337 | A * | 8/1977 | Brown | C10M 7/00 | 106/629 |
| 4,110,095 | A * | 8/1978 | Stengle, Jr. | C03B 40/02 | 65/169 |
| 4,140,834 | A * | 2/1979 | Marcantonio | C10M 111/00 | 428/419 |
| 4,264,350 | A | 4/1981 | Thomas | | |
| 4,816,057 | A * | 3/1989 | Pinkerton | C03B 9/1936 | 65/163 |
| 5,202,156 | A * | 4/1993 | Yamamoto | C23C 16/26 | 427/523 |
| 5,266,093 | A * | 11/1993 | Konishi | C03B 9/1936 | 65/158 |
| 5,409,531 | A * | 4/1995 | Deyama | B22D 17/2007 | 106/272 |
| 6,409,813 | B1 * | 6/2002 | Beesabathina | C03B 9/48 | 106/38.22 |
| 2001/0009103 | A1 * | 7/2001 | Takagi | C03B 11/086 | 65/102 |
| 2006/0021384 | A1 * | 2/2006 | Schramm | C03B 40/02 | 65/169 |
| 2014/0260428 | A1 * | 9/2014 | Diehm | C03B 40/02 | 65/168 |
| 2017/0233284 | A1 * | 8/2017 | Diehm | C03B 40/02 | 65/26 |

OTHER PUBLICATIONS

Vattikuti et al., "Wettability of Molten Glass on Water based Sol-Gel Coatings"; Procedia Materials Science 6 ( 2014 ), pp. 1837-1849.

Invitation to pay Additional Fee, EP application No. PCT/US2022/049253, dated Mar. 14, 2023, 13 pages, European patent office.

Karadag Mehmet et al., "Effect of hexagonal boron nitride on the coefficient of frictions of organic-inorganic hybrid polymer thin films for metal surface coatings", Journal of Adhesion Science and Technology, vol. 34, No. 20, Jul. 2020, pp. 2200-2215.

* cited by examiner

MOLD RELEASE COATINGS FOR GLASS FORMING OR PROCESSING EQUIPMENT AND RELATED METHODS

CROSS-REFERENCE TO RELATED APPLICATIONS

This application is a national stage entry under 35 U.S.C. § 371 of International Application No. PCT/US2022/049253, filed on Nov. 8, 2022, which claims the benefit of priority under 35 U.S.C. § 119 of U.S. Provisional Application No. 63/282,446, filed Nov. 23, 2021, the content of each of which is incorporated herein by reference in its entirety.

FIELD

Generally, the present specification is directed towards a mold release coating and corresponding thermal barrier coating that provide improved performance of molten or hot glass or glass ceramic hot working surfaces in glass forming operations. More specifically, the present embodiments are directed towards new compositions and configurations of mold release coatings combined with thermal barrier coatings to impart improved performance to glass forming equipment.

BACKGROUND

It is desirable for the molten glass to readily flow over the molding surface of the mold, taking the shape of the mold cavity, and then to readily separate from it. For the Glass contacting surfaces in such operations glass forming equipment requires a lubricant to prevent the glass (gob) from sticking to the surfaces mold/mold ring/plunger toolset and to prevent the mold and mold components from becoming damaged (abrading or pitting, caused by dragging/abrasive effect of mold surface imparted by the glass).

In some glass forming operations, the mold surfaces are frequently treated with a release compound by spraying, brushing or swabbing the mold surfaces during the forming operation, so as to provide lubrication of the interacting mold sections to prevent sticking of the molten glass to the mold surfaces. The release compound is composed of mineral oil and graphite, where the oil burns off at elevated temperatures, producing hazardous odors, smoke, and soot. These issues produce fire hazards, health concerns, additional process steps (application of release compound) and potential environmental issues. Moreover, hard carbon buildups occur on the mold, creating inferior product forms after repeated mold use.

In other glass forming operations a flame-sprayed carbon soot is utilized, where an acetylene/oxygen flame is used to apply a very thin coating of soot to the tool surfaces just prior to each gobbing/pressing operation. Unfortunately, repeated carbon sooting leads to coating buildup on the mold components, and subsequently, the resulting loss of geometric fidelity in the pressed parts. Also, in instances of high tooling temperatures utilization, the soot burns off prior to the completion of the gobbing/pressing cycle, so the soot coating fails before the intended event needing lubrication.

Moreover, there are some limited instances of solid film lubricants. However, these lubricants utilize organic binders which are not retained on mold components during the rigorous operating conditions and high temperatures used in glass-forming operations. In instances where inorganic binders were utilized, they contained silicates or phosphates of alkali and alkaline, which readily reacted with the glass compositions, thus creating failed formed parts.

SUMMARY

The present disclosure is directed towards forming thin, three-dimensional glass or glass ceramic parts, while utilizing a thermal barrier coating between the glass and the mold, which reduces thermal conductivity between the glass and the mold. Also, the mold release coating will help with releasing the part from the mold, as it's configured to act as a slip layer.

In one aspect, a pressing unit is provided, comprising: a mold and a plunger, wherein the mold is configured to receive a gob of glass material or glass ceramic material and process the gob into a product form, and a coating configured on at least one of: the surface of the mold which is configured adjacent to the gob and/or product form, to form a coated mold and the surface of the plunger which is configured adjacent to the gob and/or product form, to form a coated plunger, wherein the coating comprises: a mold release coating, configured as the gob-contacting surface, wherein the mold release coating comprises: at least two solid lubricants selected from: tungsten disulfide, boron nitride, graphite, and glassy carbon, and an organo-silica binder; and a thermal barrier coating comprising barrier material components and an organo-silica binder, wherein the thermal barrier coating is configured to extend between at least one of: the mold release coating and the portion of the coated mold and the mold release coating and the portion of the coated plunger.

In some embodiments, the thermal barrier coating comprises: barrier material components retained in an organo-silica binder.

In some embodiments, the barrier material components are selected from the group consisting of: cerium oxide: zirconium oxide; and silica.

In some embodiments, the barrier material components are present in an amount of not greater than 80% by weight of the thermal barrier coating.

In some embodiments, the binder material is present in an amount of not greater 35% by weight in the thermal barrier coating.

In some embodiments, the mold release coating comprises solid lubricants of: boron nitride and glassy carbon present in a total amount of not greater than 80 percent by weight in the mold release coating.

In some embodiments, the mold release coating comprises solid lubricants of: boron nitride and tungsten disulfide present in a total amount of not greater than 80 percent by weight in the mold release coating.

In some embodiments, the mold release coating comprises solid lubricants of: tungsten disulfide, boron nitride, graphite, and glassy carbon present in a total amount of not greater than 50 percent by weight in the mold release coating.

In some embodiments, the pressing unit further includes: a mold ring mount attached to the mold and configured to mount on a press.

In some embodiments, the mold is made of cast iron.

In some embodiments, the plunger is made of cast iron.

In some embodiments, the mold is configured with a mold cavity.

In some embodiments, the equipment further includes: a melting unit, configured to melt a glass or glass ceramic material to form a melt; and a gob forming unit, configured to attach to the melting unit to receive the melt and dispense portions of the melt into a plurality of metered gobs into the pressing unit.

In some embodiments, each gob is configured with: a pre-determined amount of material having an elevated temperature at deposition in the mold in the range of 1350 degrees C. to 1600 degrees C.

In one aspect, a glass or glass-ceramic forming equipment is provided, comprising: a melting unit, configured to melt a glass or glass ceramic material; a gob forming unit, configured to dispense portions of a melt of glass or glass ceramic material into a plurality of metered gobs, where each of the gobs is configured with: a pre-determined amount of material having an elevated temperature such that the viscosity of each gob at the time of deposition in the mold in the range of 1350 degrees C. to 1600 degrees C.; a pressing unit, configured to receive and process the gob into a product form, wherein the pressing unit is configured with a coating configured on portions of the pressing unit which contact the gob, the coating comprising: a mold release coating, configured as the gob-contacting surface; and a thermal barrier coating configured to extend between the mold release coating and the portions of the pressing unit adjacent to the gob-contacting surface of the mold release coating.

In some embodiments, the pressing unit further comprises: a plunger, a mold and a mold ring mounted on a press.

In some embodiments, the mold and coating has a temperature of in the range of at least 250 degrees C. to not greater than 500 degrees C.

In another aspect of the present disclosure, a mold release composition is provided, comprising: a mixture of: at least two solid lubricants; and an organ-silica solution.

In some embodiments, the at least two solid lubricants are selected from the group consisting of: tungsten disulfide, boron nitride, graphite and glassy carbon.

In one aspect, a mold release composition is provided, comprising: greater than or equal to 20 wt. % and less than or equal to 70 wt. % boron nitride: optionally, greater than or equal to 3 wt. % and less than or equal to 21 wt. % tungsten disulfide: optionally, greater than or equal to 4 wt. % and less than or equal to 11 wt. % glassy carbon: optionally, less than or equal to 5 wt. % graphite, where at least some graphite is present, the remainder, organo-silica solution.

In one aspect, a thermal barrier coating is provided, including: a barrier material comprising: cerium oxide, zirconium oxide, and silica; and a binder comprising an organo-silica solution.

In one aspect, a thermal barrier coating is provided, comprising: at least one barrier material component comprising: cerium oxide, zirconium oxide, and silica; and a binder comprising an organo-silica solution.

In one aspect, a thermal barrier coating composition is provided, comprising: greater than or equal to 60 wt. % and less than or equal to 85 wt. % of a barrier material component; and greater than or equal to 15 wt. % and less than or equal to 40 wt. % of a binder comprising an organo-silica solution.

In some embodiments, the barrier material components further comprise: greater than or equal to 12 wt. % and less than or equal to 45 wt. % of a cerium oxide: greater than or equal to 10 wt. % and less than or equal to 30 wt. % of a zirconium oxide comprising an organo-silica solution; and greater than or equal to 5 wt. % and less than or equal to 15 wt. % of silica.

In one aspect, a method is provided, comprising: directing a layer of alcohol-based material onto a plurality of glass-contacting surfaces in a glass or glass-ceramic pressing or glass or glass-ceramic processing assembly, wherein the layer is configured as a thermal barrier layer: applying over the thermal barrier laver, a mold release mixture, wherein the mold release mixture comprises: an alcohol-based of a mixture including: (i) a plurality of solid lubricant components; and (ii) an organo-silica binder: removing the alcohol from the thermal barrier layer and the mold release to form a dried thermal barrier layer and a dried mold release mixture; and curing the dried thermal barrier layer and the dried mold release mixture at an elevated temperature for a sufficient duration of time to transform: (i) the dried thermal barrier layer into a thermal barrier coating and (ii) the dried mold release mixture into a mold release coating, wherein the mold release coating is adhered onto the glass contact surfaces of the glass processing assembly via the thermal barrier coating.

In some embodiments, the alcohol-based mixture comprises a dispersion.

In some embodiments the cross-sectional thickness of the thermal barrier coating is: at least 5 microns to not greater than 20 microns. In some embodiments the cross-sectional thickness of the thermal barrier coating is: at least 5 microns to not greater than 10 microns. In some embodiments the cross-sectional thickness of the thermal barrier coating is: at least 5 microns to not greater than 15 microns. In some embodiments the cross-sectional thickness of the thermal barrier coating is: at least 10 microns to not greater than 15 microns. In some embodiments the cross-sectional thickness of the thermal barrier coating is: at least 10 microns to not greater than 20 microns.

In some embodiments the cross-sectional thickness of the thermal barrier coating is: at least 5 microns: at least 10 microns: or at least 15 microns thick.

In some embodiments the cross-sectional thickness of the thermal barrier coating is: not greater than 10 microns, not greater than 15 microns, not greater than 20 microns thick.

In some embodiments the cross-sectional thickness of the mold release coating is: at least 5 microns to not greater than 20 microns. In some embodiments the cross-sectional thickness of the mold release coating is: at least 5 microns to not greater than 10 microns. In some embodiments the cross-sectional thickness of the mold release coating is: at least 5 microns to not greater than 15 microns. In some embodiments the cross-sectional thickness of the mold release coating is: at least 10 microns to not greater than 15 microns. In some embodiments the cross-sectional thickness of the mold release coating is: at least 10 microns to not greater than 20 microns.

In some embodiments the cross-sectional thickness of the mold release coating is: at least 5 microns: at least 10 microns: or at least 15 microns thick.

In some embodiments the cross-sectional thickness of the mold release coating is: not greater than 10 microns, not greater than 15 microns, not greater than 20 microns thick.

In some embodiments the cross-sectional thickness of the embodied coating (i.e., thermal barrier coating+mold release coating) is: at least 10 microns to not greater than 40 microns. In some embodiments the cross-sectional thickness of the mold release coating is: at least 15 microns to not greater than 40 microns. In some embodiments the cross-sectional thickness of the mold release coating is: at least 20 microns to not greater than 40 microns. In some embodiments the cross-sectional thickness of the mold release coating is: at least 25 microns to not greater than 40 microns.

In some embodiments the cross-sectional thickness of the mold release coating is: at least 30 microns to not greater than 40 microns.

In some embodiments the cross-sectional thickness of the embodied coating (i.e., thermal barrier coating+mold release coating) is: at least 10 microns to not greater than 30 microns. In some embodiments the cross-sectional thickness of the mold release coating is: at least 10 microns to not greater than 25 microns. In some embodiments the cross-sectional thickness of the mold release coating is: at least 10 microns to not greater than 30 microns. In some embodiments the cross-sectional thickness of the mold release coating is: at least 10 microns to not greater than 35 microns.

In some embodiments the cross-sectional thickness of the embodied coating (i.e., thermal barrier coating+mold release coating) is: at least 15 microns to not greater than 35 microns.

In some embodiments the cross-sectional thickness of the mold release coating is: at least 20 microns to not greater than 35 microns.

In some embodiments the cross-sectional thickness of the embodied coating (i.e., thermal barrier coating+mold release coating) is: at least 10 microns; at least 15 microns: at least 20 microns; at least 25 microns: at least 30 microns: or at least 35 microns thick.

In some embodiments the cross-sectional thickness of the embodied coating (i.e., thermal barrier coating+mold release coating) is: not greater than 15 microns; not greater than 20 microns; not greater than 25 microns: not greater than 30 microns: not greater than 35 microns, or not greater than 40 microns thick.

In some embodiments, the average particle sizes of the barrier material (non-limiting examples including: cerium oxide, zirconium oxide, and silica) ranges from at least 40 nm to not greater than 2 microns. In some embodiments, the average particle size for barrier materials is sub-micron. As non-limiting examples, average particle sizes for the barrier materials utilized in the Examples provided herein are as follows: the zirconium oxide had an average particle size of 800 nm: the cerium oxide had an average particle size of 2 microns; and the silica had an average particle size of 50 nm.

In some embodiments, the average particle sizes of the solid lubricant materials ranges from at least 2 microns to not greater than 10 microns. As non-limiting examples, the average particle sizes for the solid lubricant components utilized in the Examples provided herein are as follows: the boron nitride had an average particle size of 2 microns: the tungsten disulfide had an average particle size of 2 microns; and the glass carbon had an average particle size for the glassy carbon was 10 microns.

In some embodiments, the coating, including thermal barrier coating and mold release coating, are configured as pre-formed, solid coatings which are configured for improved cycle time and improved product form dimensions, as compared to previously utilized coatings in glass forming operations.

In some embodiments, the embodied coatings are oxidation resistant in contact when in contact with the gobs at high forming temperatures. In some embodiments, the coatings are configured to protect the mold components from abrading and/or pitting from repeated use in glass forming operations.

In some embodiments, the mold release composition is configured to impart improved lubricity and/or release properties to the contact surfaces of glass forming equipment, as compared to previously utilized glass forming equipment coatings.

In some embodiments, the mold release composition is configured for durability and effective lubrication and release at high temperatures, typically utilized for glass and glass ceramic forming operations.

In some embodiments, the thermal barrier coating is configured to promote adhesion of the mold release composition to the mold components. In some embodiments, the thermal barrier coating is configured to minimize heat loss.

In some embodiments, the coatings embodied herein can be utilized in glass forming operations, including glass molding, glass pressing, and/or near net shape forming processes (i.e., forming a mostly formed product, which is then finished in relatively minor form to provide the final product, resulting in fewer process steps and/or less glass utilization/material waste). In or more of the glass forming/glass processing operations described herein, with the utilization of the embodied coatings, is configured to provide uniquely shaped, non-traditional glass forms which have tight tolerances, non-traditional shapes/configurations and/or thin sidewall(s) or discontinuously thick portions/variable thick portions of product forms. In some embodiments, the product forms and/or final products are configured as consumer electronic components, portions of cell phones (phone backs, phone fronts, phone enclosures portions), wireless charging components, and/or 5G components. The other advantage is the ability to form variable thickness parts. In some embodiments, the coatings described herein are utilized on manufacturing equipment, forming equipment, and glass or glass-ceramic handling equipment, which all tend to be utilized in elevated temperature applications.

In some embodiments, the coatings embodied herein provide improved lubricity, as compared to the previous coatings. In some embodiments, lubricity is quantified/measured by determining the coefficient of friction (CoF), through utilization of a tribometer. In some embodiments, mold components (e.g., glass processing equipment components) require replacement if/when there's a sufficient number of cycles such that the parts/components are out of tolerance (as compared to target tolerances in the mold and/or during routine examination during use, there are observed pressing cycle flaws and/or checks that appear on the part/component.

In some embodiments, the coatings embodied herein provide improved release, as compared to previous coatings. Release properties is a broader characterization of some discrete variables, including these measurable/quantifiable items: surface release energy; coefficient of friction, and wear rate. The release properties are measured by applying release coating to a coupon containing the same mold material and then measuring the properties using standard test methods for the identified variables.

In some embodiments, the alcohol is selected from ethanol, methanol, isopropanol, and/or combinations thereof.

Additional features and advantages of the glass compositions described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description serve to explain the principles and operations of the claimed subject matter.

DETAILED DESCRIPTION

Reference will now be made in detail to various embodiments of the present disclosure, which will be described herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components: plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Figure 1A:
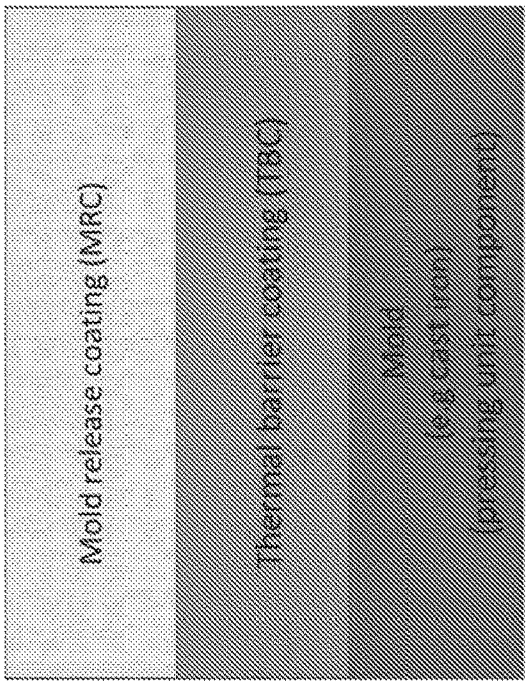
FIG. 1A depicts a cross-sectional representation of a bi-layer coating on a portion of a glass forming equipment (e.g., mold), in accordance with one or more embodiments of the present disclosure.

FIG. 1A depicts a cross-sectional representation of a bi-layer coating on a portion of a glass forming mold, in accordance with one or more embodiments of the present disclosure.

Referring to FIG. 1A, a pressing unit component, which is shown as a mold surface composed of cast iron, has a coating applied to its surface, in accordance with one or more embodiments of the present disclosure. As shown in FIG. 1A, the coating includes a thermal barrier coating covering the portion of the mold surface. Over the thermal barrier coating, a mold release coating is applied, in accordance with one or more embodiments of the present disclosure.

Figure 1B:
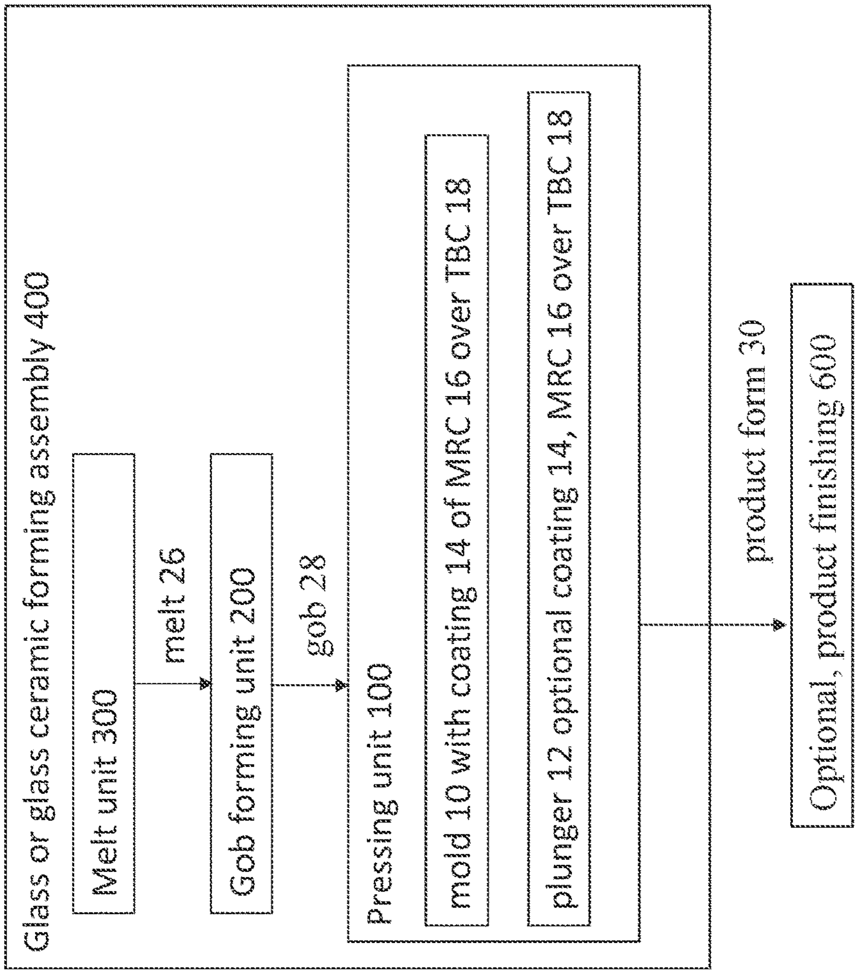
FIG. 1B depicts a schematic of an embodiment of a pressing assembly, in accordance with one or more aspects of the present disclosure.

Referring to FIG. 1B, a glass or glass ceramic forming assembly 400 is depicted. The forming assembly 400 includes a melting unit 300; a gob forming unit 200; a pressing unit 100; and optionally, after the forming assembly 400, a product finishing assembly 600. As shown in FIG. 1B, the melt unit 300 forms the melted glass or glass ceramic material, the melt 26. The melt is directed via arrow towards the cob forming unit 200, where the melt 26 is dispensed into gob after gob (i.e., a plurality of gobs, in continuous or semi-continuous frequency), where each gob 28 is directed into the pressing unit 100. In this embodiment of the pressing unit 100, the gob 28 is retained in the mold 10. The mold 10 is configured with a coating 14, which includes a mold release coating 16 which is configured over a thermal barrier coating 18. The mold 10 is configured to actuate with a plunger 12 in order to form a product form 30. In some embodiments, the plunger 12 is also configured with a mold release coating that is configured over a thermal barrier coating 18. When the gob 28 is formed into a product form 30 via actuation of the mold 10 with the plunger 12, the resulting product form 30 is defined with improved product dimensions, improved release from the mold, improved dimensions correlating to the target product form dimensions, etc.) as compared to a pressing assembly 100 coated with previous coatings (non-invention). The product form 30 is then directed out from the glass or glass forming assembly 400.

Figure 2:
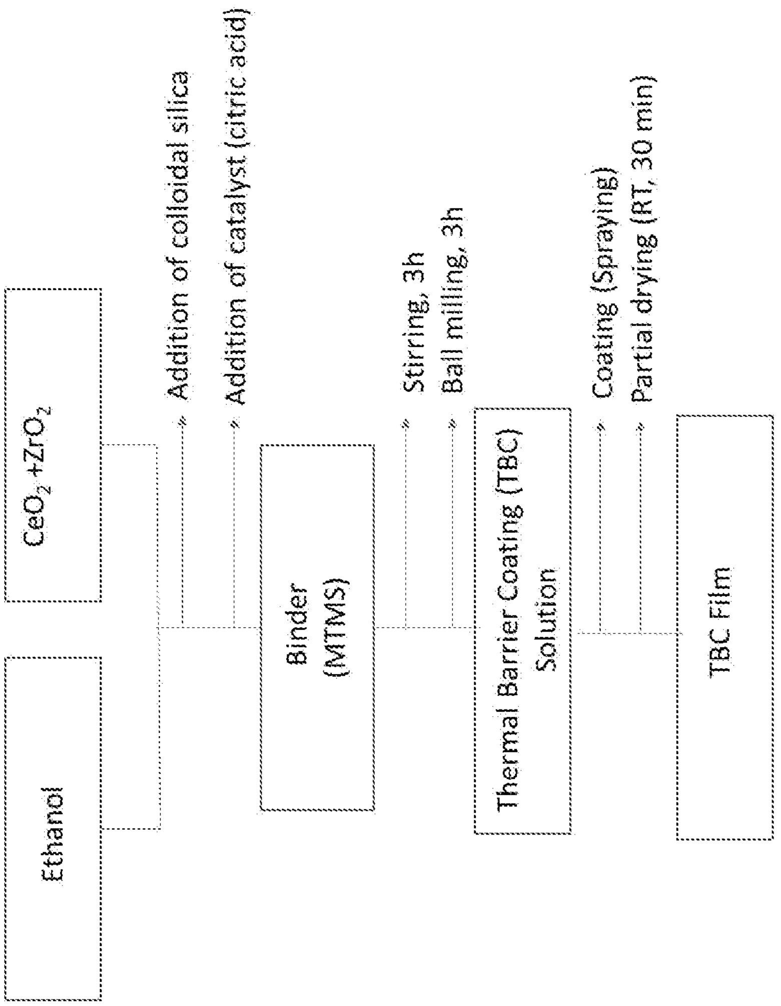
FIG. 2 depicts a schematic drawing of an embodiment of a method for preparing and forming the thermal barrier coating (TBC) on the glass forming equipment (e.g., mold), in accordance with one or more embodiments of the present disclosure.

Referring to FIG. 2, the thermal barrier coating (TBC) is prepared according the embodied method. A TBC solution is prepared by a 1-step sol-gel reaction. During the sol formulation, a silica source and catalyst are added to a mixture of alcohol and thermal barrier components. In one embodiment, the silica source is colloidal silica, the catalyst is citric acid, the alcohol is ethanol, and the thermal barrier components include both cerium oxide ($CeO_2$) and zirconium oxide ($ZrO_2$). After the sol is formed, a binder is added. In this embodiment, the binder is methyltrimethoxysaline (MTMS). Next, the formed sol solution is mixed for a sufficient duration of time to promote mixing and breaking up any localized discontinuities of the thermal barrier components, promoting a mixed and dispersed sol solution. In this embodiment, the sol solution is ball milled for three (3) hours to form the final sol solution. The sol solution of thermal barrier mixture is then directed onto the surface (i.e., glass contacting surface(s)) of the glass forming and/or processing equipment. In this embodiment, the sol solution is directed by spraying via a spray gun over the surface of the tools. The sol solution is allowed to set on the surfaces for a sufficient time before the mold release mixture is applied to the surface of the dried sol solution. In this embodiment, the sol solution was allowed to dry for approximately 30 minutes (e.g., at least 30 minutes).

Figure 3:
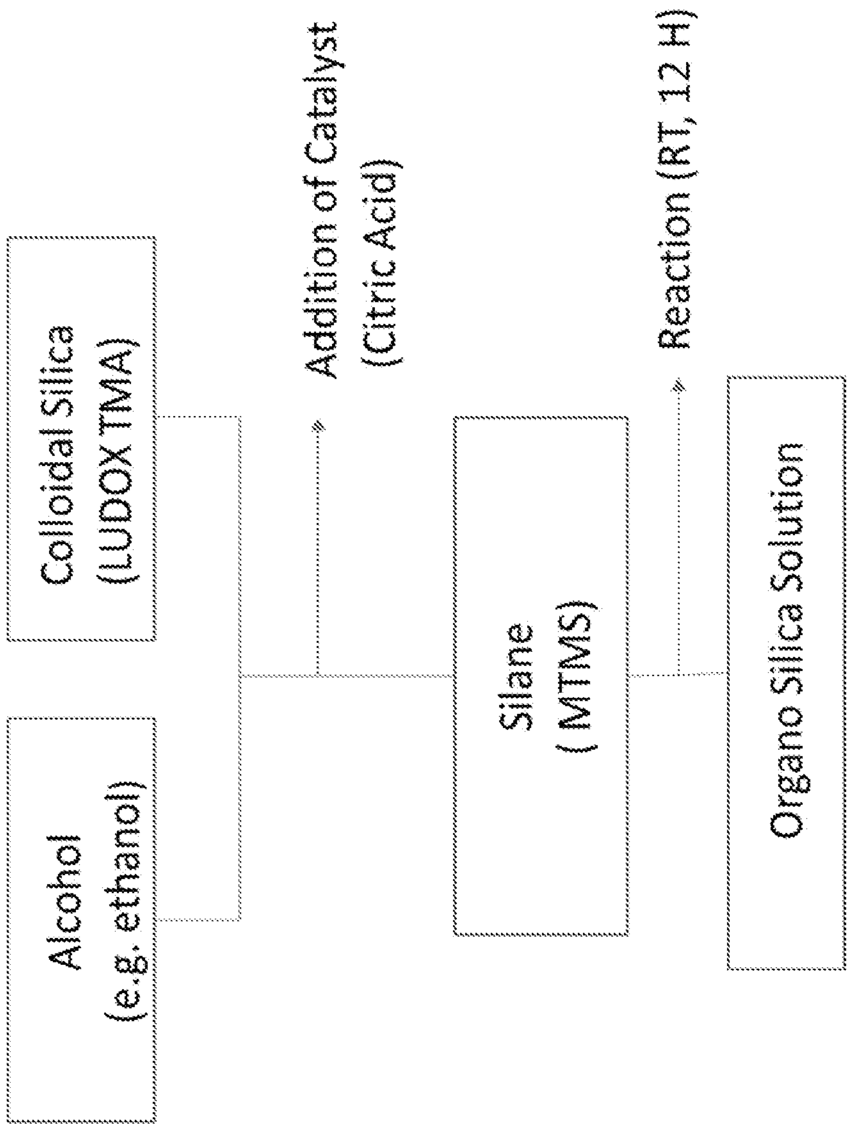
FIG. 3 is a schematic drawing of an embodiment of a method for making an organo-silica solution used as binder for preparing the mold release coating, in accordance with one or more embodiments of the present disclosure.

Referring to FIG. 3, the mold release coating (MRC) solution was prepared in the same manner as the TBC solution, except that no thermal barrier components (cerium oxide or zirconium oxide) was added to the solution. An MRC solution is prepared by a 1-step sol-gel reaction. During the sol formulation, a silica source and catalyst are added to a mixture of alcohol and thermal barrier components. In one embodiment, the silica source is colloidal silica, the catalyst is citric acid, the alcohol is ethanol. After the sol is formed, a binder is added. In this embodiment, the binder is methyltrimethoxysaline (MTMS) Next, the formed sol solution is mixed for a sufficient duration of time to promote mixing and/or dispersing of the sol solution. In this embodiment, the sol solution is ball milled for three (3) hours to form the final sol solution. The sol solution of thermal barrier mixture is then directed onto the surface (i.e., glass contacting surface(s)) of the glass forming and/or processing equipment. In this embodiment, the sol solution is directed by spraying via a spray gun over the surface of the tools. The sol solution is allowed to set on the surfaces for a sufficient time before the mold release mixture is applied to the surface of the dried sol solution. In this embodiment, the sol solution was allowed to dry for approximately 30 minutes (e.g., at least 30 minutes).

Figure 4:
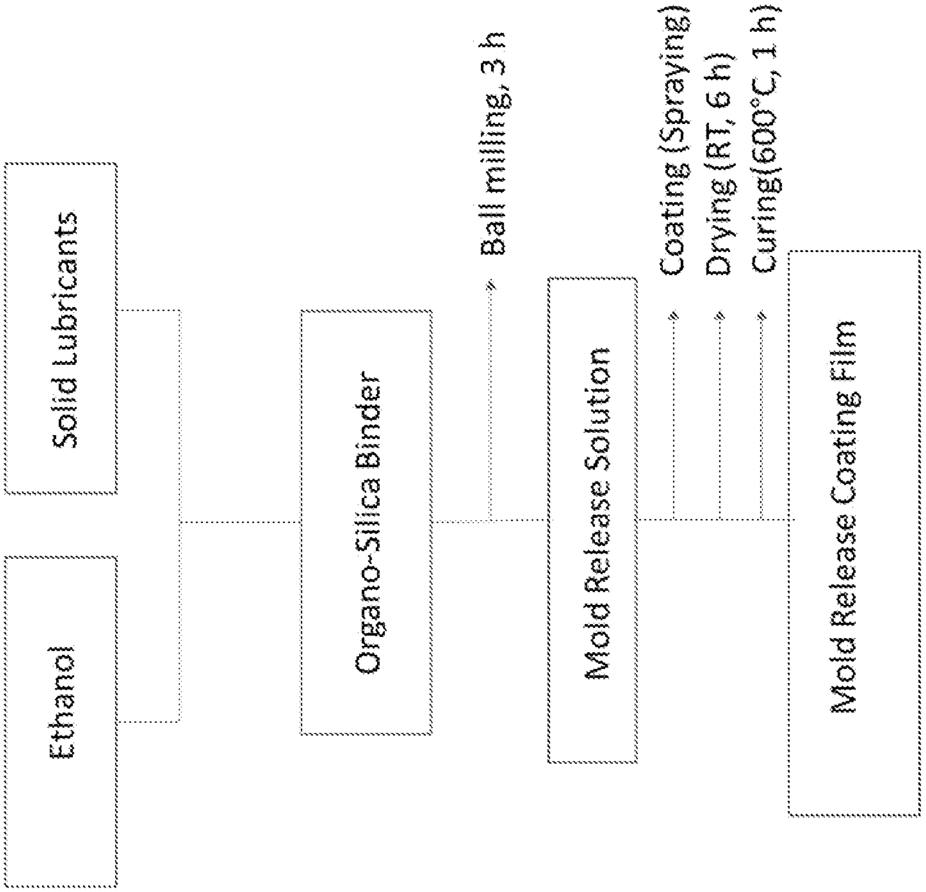
FIG. 4 depicts a schematic drawing of an embodiment of a method for forming the mold release coating (MRC), in accordance with one or more embodiments of the present disclosure.

Referring to FIG. 4, the embodied detailed procedure is summarized as follows: (i) the coating solution is prepared by dispersing the binder and solid lubricants in alcohol (e.g. ethanol) and mixing while dispersing (e.g. ball milling) for a sufficient duration of time (e.g. three (3) hours), (ii) the mixture is directed (e.g. sprayed) over the TBC layer portion(s); and (iii) the stack, including the dried TBC mixture and the mold release coating, is fully dried at room temperature, followed by cured at an elevated temperature (e.g. 600° C.) for a sufficient time to adhere and cure the thermal barrier coating and mold release coating.

Figure 5:
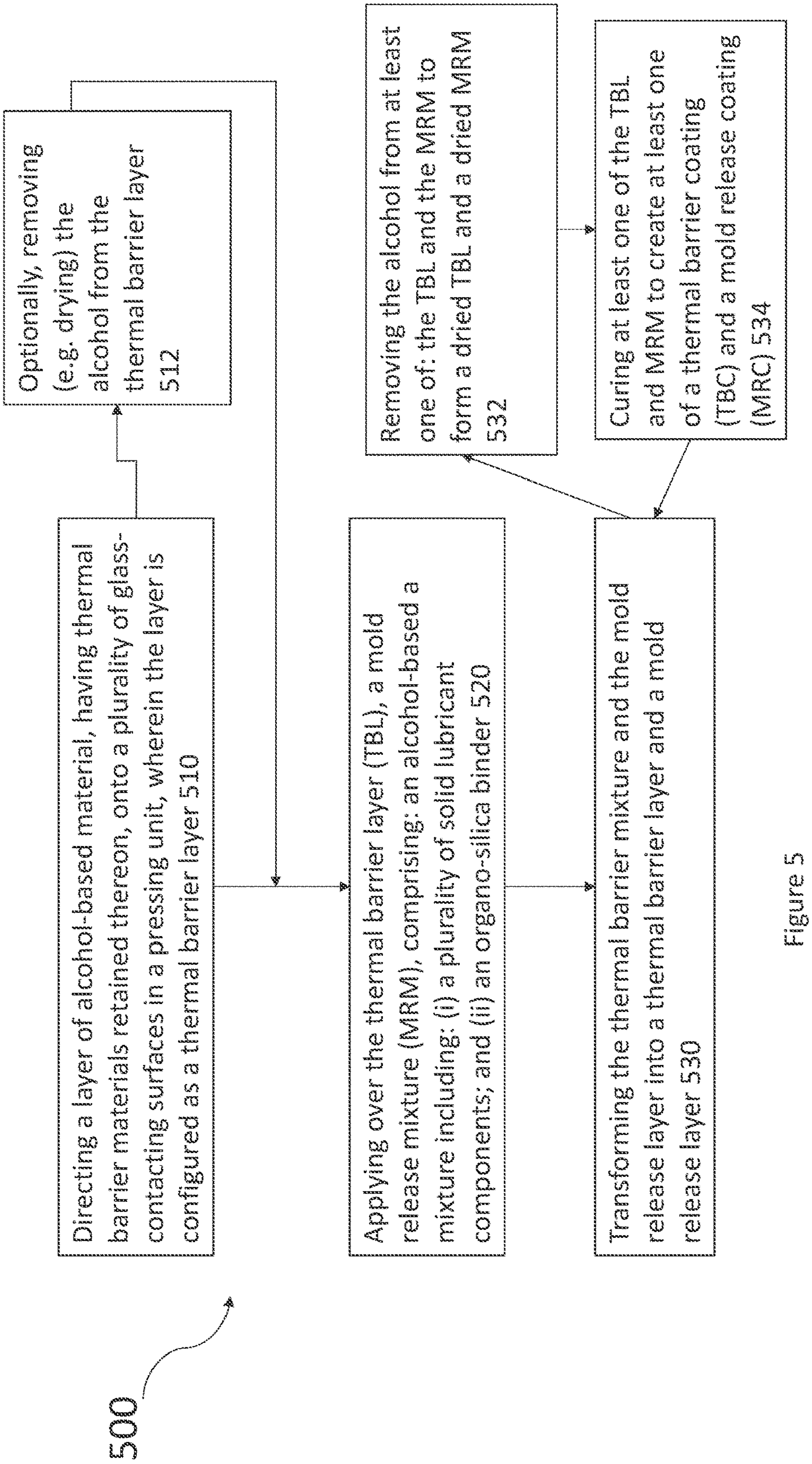
FIG. 5 depicts a flow chart, which illustrates an embodiment of a method of making the coated forming articles of the present disclosure.

Referring to FIG. 5, the method 500 includes the steps of: directing a layer of alcohol-based material, having thermal barrier materials retained thereon, onto a plurality of glass-contacting surfaces in a pressing unit, wherein the layer is configured as a thermal barrier layer 510; applying over the thermal barrier layer (TBL), a mold release mixture (MRM), comprising: an alcohol-based a mixture including: (i) a plurality of solid lubricant components; and (ii) an organo-silica binder 520; and transforming the thermal barrier mixture and the mold release layer into a thermal barrier layer and a mold release layer 530.

In some embodiments, the directing step further comprises: removing (e.g., drying) the alcohol from the thermal barrier layer 512.

In some embodiments, the transforming step further includes: Removing the alcohol from at least one of: the TBL and the MRM to form a dried TBL and a dried MRM 532 and/or Curing at least one of the TBL and MRM to create at least one of a thermal barrier coating (TBC) and a mold release coating (MRC) 534.

EXAMPLES

In order that various embodiments be more readily understood, reference is made to the following examples, which are intended to illustrate various embodiments of the mold coatings described herein. In the tables that follow, a variety of embodied compositions were made and evaluated according to the embodiments set out herein.

Example 1

FIG. 1 is a cross-sectional presentation of a bi-layer coating (TBC+MRC) formed on the surface of a glass forming mold. The coatings were prepared as follows. The first step was preparation of the TBC solution by the processing steps shown schematically in FIG. 2. The TBC solution was prepared by mixing 28 parts $CeO_2$, 8.4 parts yttrium stabilized $ZrO_2$, 6.72 parts colloidal silica (LUDOX TMA, 34 wt %), 1.82 parts citric acid, 21.52 parts MTMS and 104.36 parts ethanol. The mixture was ball milled at room temperature for 3 hours and was ready for spray coating. The second step was preparation of the organo-silica solution used as bind for forming the WRC film. The binder solution was prepared by mixing 3.5 parts boron nitride, 20.51 parts colloidal silica, 1.5 parts citric acid, 52.71 parts MTMS and 43 parts ethanol. The mixture was stirred at room temperature for 12 hours. The third step was preparation of the MRC solution schematically in FIG. 4. The coating solution was prepared by mixing 22.5 parts boron nitride, 3.38 parts glassy carbon, 7.76 parts of binder and 145.37 parts ethanol. The mixture solution was ball milled for about 3 hours. The final steps were the general cleaning of the mold and plunger, and application of the TBC and MRC solutions which proceeded as follows.

Conventional cast iron blank mold and plunger were initially cleaned by preheating to 300° C. to remove any residual or organic materials, such as oils, etc. The surfaces of the blank mold and plunder were then lightly sandblasted to remove any residual scale, rust, or other foreign materials on them. Next, the TBC solution was sprayed by a spray gun over the sandblasted surfaces of the mold and plunger. The spray parts were partially dried for 30 min at room temperature.

TABLE 1

Composition of the thermal barrier coating embodied in the Examples

| Material | Min Wt. % | Target Wt. % for this Example | Max Wt. % |
|---|---|---|---|
| Barrier material | | | |
| $CeO_2$ | 12 | 43.3 | 45 |
| $ZrO_2$ | 10 | 13 | 30 |
| Silica | 5 | 10.4 | 15 |
| Binder | | | |
| Organo-silica solution | 15 | 33.3 | 40 |

After the partial drying, the MRC solution was sprayed coated over the TBC film. The stack was dried at room temperature for 6 hours and then cured at 600° C. for 1 hour under flowing $N_2$. The composition of the applied WRC coating is shown in Table 2.

TABLE 2

| Composition of mold release coating prepared in Example 1 | | | |
|---|---|---|---|
| Material | Min Wt. % | Target Wt. % for this Example | Max Wt. % |
| Solid lubricants | | | |
| Boron nitride | 50 | 67 | 70 |
| Glassy carbon | 5 | 10 | 10 |
| Binder | | | |
| Organo-silica solution | 15 | 23 | 30 |

Example 2

Another blank mold and plunger, similar to the one employed in Example I, was coated following the same procedure used in the foregoing example, with the exception that the WRC spray mixture contained 22.5 parts boron nitride, 1.13 parts tungsten disulfide, 7.09 parts binder and 122.94 parts ethanol. The composition of the coating is shown in Table 3.

TABLE 3

| Composition of mold release coating prepared in Example 2 | | | |
|---|---|---|---|
| Material | Min Wt. % | Target Wt. % for this Example | Max Wt. % |
| Solid lubricants | | | |
| Boron nitride | 50 | 73 | 75 |
| Tungsten disulfide | 2 | 4 | 20 |
| Binder | | | |
| Organo-silica solution | 15 | 23 | 30 |

Example 3

Another blank mold and plunger, similar to the one employed in Example I, was also coated following the same procedure used in the Example 1, with the exception that the WRC spray mixture contained 8.2 parts boron nitride, 8.2 parts tungsten disulfide, 1.64 parts graphite, 1.64 parts glassy carbon and 212.5 parts ethanol. The composition of the applied coating is shown in Table 4.

TABLE 4

| Composition of mold release coating prepared in Example 3 | | | |
|---|---|---|---|
| Material | Min Wt. % | Target Wt. % for this Example | Max Wt. % |
| Solid lubricants | | | |
| Boron nitride | 10 | 21 | 30 |
| Tungsten disulfide | 10 | 21 | 30 |
| Glassy carbon | 2 | 4 | 5 |
| Graphite | 2 | 4 | 5 |
| Binder | | | |
| Organo-silica solution | 40 | 50 | 60 |

Example 4

The durability and glass release performance of the of the mold release coatings were evaluated. The objective of the process is to form molten glass into a 3D shape with variable thickness. The forming device consists of mold, plunger and mold ring. The coating is applied to the mold and plunger. To form a thin 3D part requires a slip layer on the mold with a barrier coating. The slip layer reduces surface friction of the glass to the mold. The heat barrier coating on the mold keeps the mold from acting like a heat sink and cools the glass. Glass temperature is 1350-1600° C. Another function of the slip layer helps prevent the glass from sticking to the mold. The coatings were evaluated with different glass compositions, pressing forces and different mold temperatures. Mold and plunger temperature range was 250-550° C. Pressing force was 10 k-17 k pounds of force. Glass is poured on the mold from a Melter. The mold is indexed into the press and the plunger contacts glass gob to form the part. Plunger is retracted and mold indexes out. The cycle time is 3 sec. The cycle repeats itself every 10-15 sec. In production cycle would repeat itself every 2-3 seconds. The durability of the coating is an important characteristics that contributes to the slip layer and thermal aspects of the coating during utilization. It was observed that the surfaces of the parts remained intact in each of the Examples and none of the molds failed within the available run time for this Example The table below depicts the number of cycles for each coating along with the number of parts made.

TABLE 5

| Glass release performance of mold release coatings during a mold pressing test | | |
|---|---|---|
| Coating Description | No. of molding cycles | No. of parts made |
| EXAMPLE 1 Coating | 1 | 20 |
| EXAMPLE 2 Coating | 1 | 20 |
| EXAMPLE 3 Coating | 5 | 100 |

REFERENCE NUMBERS pressing unit 100
mold 10
plunger 12
coating 14
mold release coating 16
thermal barrier coating 18
mold ring mount 20
mold cavity 22
press 24
melting unit 200
gob forming unit 300
glass forming equipment 400
melt 26
gob 28
product form 30
method of making coated glass forming equipment 500
directing 510
removing 512
applying 520
transforming 530
removing 532
curing 534

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A pressing unit, comprising:

a mold and a plunger, the mold configured to receive a gob of glass material or glass ceramic material and process the gob into a product form; and a coating configured on at least one of:

a surface of the mold which is configured adjacent to the gob and/or product form, to form a coated mold, or a surface of the plunger which is configured adjacent to the gob and/or product form, to form a coated plunger, wherein the coating comprises:

a mold release coating configured as a gob-contacting surface, the mold release coating comprising: glassy carbon and at least one solid lubricant selected from: tungsten disulfide, boron nitride, and graphite; and a first organo-silica binder; and a thermal barrier coating comprising barrier material components and a second organo-silica binder, the thermal barrier coating extending between at least one of: the mold release coating and the surface of the mold, or the mold release coating and the surface of the plunger.

2. The pressing unit of claim 1, wherein the barrier material components are retained in the second organo-silica binder.

3. The pressing unit of claim 2, wherein the barrier material components are selected from the group consisting of, cerium oxide, zirconium oxide, and silica.

4. The pressing unit of claim 2, wherein the barrier material components are present in an amount not greater than 80 percent by weight of the thermal barrier coating.

5. The pressing unit of claim 2, wherein the second organo-silica binder is present in an amount not greater 35 percent by weight in the thermal barrier coating.

6. The pressing unit of claim 1, wherein the mold release coating comprises boron nitride and glassy carbon present in a total amount not greater than 80 percent by weight in the mold release coating.

7. The pressing unit of claim 1, wherein the mold release coating comprises tungsten disulfide, boron nitride, graphite, and glassy carbon present in a total amount not greater than 50 percent by weight in the mold release coating.

8. The pressing unit of claim 1, further comprising a mold ring mount attached to the mold and configured to mount on a press.

9. The pressing unit of claim 1, wherein one or more of the mold or the plunger is made of cast iron.

10. The pressing unit of claim 1, wherein the mold comprises a mold cavity.

11. The pressing unit of claim 1, further comprising:

a melting unit configured to melt a glass or glass ceramic material to form a melt; and a gob forming unit configured to attach to the melting unit and receive the melt and dispense portions of the melt into as a plurality of metered gobs into the pressing unit.

12. The pressing unit of claim 1, wherein each gob is configured with a pre-determined amount of material having an elevated temperature at deposition in the mold in a range of 1350 degrees C. to 1600 degrees C.

13. A glass or glass-ceramic forming equipment, comprising:

a melting unit configured to melt a glass or glass ceramic material;

a gob forming unit configured to receive the melted glass or glass ceramic material from the melting unit and dispense portions thereof into a plurality of metered gobs, where each of the gobs is configured with: a pre-determined amount of material having an elevated temperature such that the viscosity of each gob at the time of deposition in the mold in the range of 1350 degrees C. to 1600 degrees C.; and the pressing unit of claim 1, the pressing unit configured to receive the gob from the gob forming unit and process the gob into the product form.

14. The glass or glass-ceramic forming equipment of claim 13, wherein the pressing unit further comprises a mold ring mounted on a press.

15. The glass or glass-ceramic forming equipment of claim 13, wherein the mold and the coating have a temperature in the range of at least 250 degrees C. to not greater than 500 degrees C.

* * * * *